(12) United States Patent
Williams et al.

(10) Patent No.: US 8,151,824 B2
(45) Date of Patent: Apr. 10, 2012

(54) BALANCED SOLENOID VALVE

(75) Inventors: Kevin C. Williams, Wixom, MI (US); Robert H. Neff, Bloomfield Village, MI (US); Jeffrey Simmonds, Brighton, MI (US)

(73) Assignee: MAC Valves, Inc., Wixom, MI (US)

( * ) Notice: Subject to any disclaimer, the term of this patent is extended or adjusted under 35 U.S.C. 154(b) by 1166 days.

(21) Appl. No.: 11/784,106

(22) Filed: Apr. 5, 2007

(65) Prior Publication Data

US 2008/0245427 A1 Oct. 9, 2008

(51) Int. Cl.
*F16K 11/07* (2006.01)

(52) U.S. Cl. ......... 137/625.69; 137/625.25; 137/625.65; 137/625.67; 251/129.18

(58) Field of Classification Search ............. 137/625.25, 137/625.65, 625.27–625.29; 251/129.18, 251/282

See application file for complete search history.

(56) References Cited

U.S. PATENT DOCUMENTS

| | | | |
|---|---|---|---|
| 1,822,668 A | 9/1931 | Protzeller | |
| 2,826,215 A | 3/1958 | Wolfslau et al. | |
| 2,987,293 A | 6/1961 | Knudson | |
| 3,368,791 A | 2/1968 | Wells | |
| 3,379,214 A | 4/1968 | Weinberg | |
| 3,429,552 A | 2/1969 | Huley et al. | |
| 3,737,141 A | 6/1973 | Zeuner | |
| 3,985,333 A | 10/1976 | Paulsen | |
| 4,050,477 A * | 9/1977 | Acar | 137/625.65 |
| 4,074,700 A | 2/1978 | Engle | |
| 4,598,736 A | 7/1986 | Chorkey | |
| 4,632,358 A | 12/1986 | Orth et al. | |
| 4,830,333 A | 5/1989 | Watson | |
| 4,832,312 A | 5/1989 | Linder et al. | |
| 4,858,956 A | 8/1989 | Taxon | |
| 4,880,033 A * | 11/1989 | Neff | 137/625.65 |
| 4,915,134 A * | 4/1990 | Toliusis et al. | 137/625.65 |
| 5,092,365 A * | 3/1992 | Neff | 137/625.65 |
| 5,211,198 A * | 5/1993 | Tinholt | 137/625.65 |
| 5,251,659 A | 10/1993 | Sturman et al. | |
| 5,277,399 A | 1/1994 | McCabe | |

(Continued)

FOREIGN PATENT DOCUMENTS

EP 0051376 5/1982

(Continued)

OTHER PUBLICATIONS

International Search Report for International Application No. PCT/US2008003766 mailed Oct. 8, 2008 (13 pages).

(Continued)

*Primary Examiner* — Craig Schneider
*Assistant Examiner* — Craig J Price

(57) ABSTRACT

A valve assembly includes a solenoid can having an internal coil. A valve body connected to the solenoid can includes an inlet port and a first valve seat. An axially adjustable retainer threadably connected to the valve body includes an end portion defining a second valve seat. A homogenous valve member/armature slidably disposed in the valve body moves in the presence of a coil generated magnetic flux between valve closed and valve open positions. A valve member/armature first surface area is in fluid communication with a pressurized fluid through the inlet port. A valve member/armature second surface area is in fluid communication with the pressurized fluid in the valve closed position. The first surface area is equal to the second surface area and the pressurized fluid acts equally on the first and second surface areas defining a pressure balanced condition in the valve closed position.

9 Claims, 10 Drawing Sheets

U.S. PATENT DOCUMENTS

| | | | |
|---|---|---|---|
| 5,396,926 A | | 3/1995 | Pataki et al. |
| 5,497,806 A | | 3/1996 | Swank et al. |
| 5,497,975 A | | 3/1996 | Achmad |
| 5,535,783 A | * | 7/1996 | Asou et al. ............... 137/625.65 |
| 5,605,386 A | | 2/1997 | Ziegler |
| 5,641,148 A | | 6/1997 | Pena et al. |
| 5,836,230 A | | 11/1998 | Sturman |
| 5,855,228 A | * | 1/1999 | Perach .................... 137/625.65 |
| 6,029,703 A | | 2/2000 | Erickson et al. |
| 6,116,276 A | | 9/2000 | Grill |
| 6,178,956 B1 | | 1/2001 | Steinmann et al. |
| 6,315,268 B1 | * | 11/2001 | Cornea et al. ............ 137/625.65 |
| 6,405,757 B1 | | 6/2002 | Jabcon |
| 6,488,050 B1 | * | 12/2002 | Jabcon .................... 137/625.65 |
| 6,685,161 B2 | | 2/2004 | Moser |
| 6,691,980 B2 | | 2/2004 | Larsen et al. |
| 6,974,117 B2 | * | 12/2005 | Dzialakiewicz et al. 251/129.08 |
| 7,210,501 B2 | * | 5/2007 | Neff et al ................. 137/625.65 |
| 2002/0162592 A1 | | 11/2002 | Bowden |
| 2003/0042450 A1 | | 3/2003 | Bircann |
| 2006/0021664 A1 | * | 2/2006 | Katsuta et al. ........... 137/625.65 |
| 2006/0027269 A1 | * | 2/2006 | Neff et al. ................ 137/625.65 |
| 2006/0065315 A1 | * | 3/2006 | Neff et al. ................ 137/625.65 |

FOREIGN PATENT DOCUMENTS

| | | |
|---|---|---|
| JP | 64041780 U | 3/1989 |
| JP | 01148181 U | 10/1989 |
| JP | 02051778 U | 4/1990 |
| JP | 05180318 | 7/1993 |
| JP | 07174106 | 7/1995 |

OTHER PUBLICATIONS

International Search Report and Written Opinion of the International Search Authority for International Application No. PCT/US2009047171, mailed Dec. 29, 2009 (8 pages).

* cited by examiner

BALANCED SOLENOID VALVE

FIELD

The present disclosure relates to solenoid operated valves used to isolate and control flow of a pressurized fluid.

BACKGROUND

The statements in this section merely provide background information related to the present disclosure and may not constitute prior art.

Solenoid operated valves are known which provide control of a fluid such as pressurized air for use in operating additional equipment such as sorters, packaging machines, food processors, and the like. In order to retain the solenoid operated valve in a closed position, biasing members such as springs are known.

It is also known, for example, in U.S. Pat. No. 4,598,736 to Chorkey that an inlet pressure of the pressurized fluid can be balanced within the valve to reduce the force required by the solenoid assembly to move a valve member between closed and open positions. Known designs have several drawbacks however. The valve member is often assembled from several parts which increases the valve costs. Known designs also provide separate resilient valve elements which can be widely spaced from each other to provide a valve open and a valve closed seal. A total displacement or throw of the valve member is commonly not adjustable. Balancing the valve member to allow free sliding motion of the valve member often requires multiple flow passages, which also increases valve costs and complexity. In addition, common valve designs do not provide for axially adjusting the spacing between seating surfaces and therefore cannot adapt to control seating integrity as wear of the resilient seal material occurs. Common valves also lack the capability to prevent the system fluid from contacting the coil of the solenoid assembly. Moisture and dirt as contaminants in the fluid can therefore enter the solenoid assembly which can result in valve sticking, reduced valve power, or delayed operating times.

SUMMARY

According to several embodiments of a pressure balanced solenoid operated valve of the present disclosure, a pressure balanced solenoid operated valve includes a solenoid can. A valve body is connected to the solenoid can. A pole piece connected to the solenoid can is operable to transfer a magnetic flux. A homogenous valve member/armature is slidably disposed in the valve body and is movable from a valve closed position to a valve open position in the presence of the magnetic flux.

According to other embodiments, a solenoid operated valve assembly includes a solenoid can having an internally disposed coil. A valve body is connected to the solenoid can. The valve body has a first valve seat. A pole piece connected to the solenoid can transfers a magnetic flux generated by the coil. An axially adjustable retainer is threadably connected to the valve body. An end portion of the retainer defines a second valve seat. Axial displacement of the retainer axially positions the second valve seat with respect to the first valve seat. A homogenous valve member/armature slidably disposed in the valve body is movable in the presence of the magnetic flux from a valve closed position having a resilient valve element in contact with the first valve seat to a valve open position having the resilient valve element in contact with the second valve seat.

According to still other embodiments, a pressure balanced solenoid operated valve assembly includes a solenoid can having an internally disposed coil. A valve body is releasably connected to the solenoid can. The valve body has an inlet port and a first valve seat. An axially adjustable retainer is threadably connected to the valve body, and has an end portion defining a second valve seat. A homogenous valve member/armature is slidably disposed in the valve body and is movable in the presence of a magnetic flux generated by the coil between a valve closed position and a valve open position. A first surface area of the valve member/armature is in fluid communication with a pressurized fluid through the inlet port. A second surface area of the valve member/armature is in fluid communication with the pressurized fluid in the valve closed position. The first surface area is substantially equal to the second surface area with the pressurized fluid acting equally on both the first and second surface areas defining a pressure balanced condition in the valve closed position.

According to still other embodiments, a solenoid operated valve assembly includes a solenoid can. A valve body is connected to the solenoid can. A pole piece connected to the solenoid is operable to transfer a magnetic flux. A homogenous valve member/armature slidably disposed in the valve body is axially movable from a valve closed position to a valve open position by a pulling force of the magnetic flux operable to pull the valve member/armature toward the pole piece.

According to additional embodiments, a solenoid operated valve assembly includes a solenoid can having an internally disposed coil. A valve body is connected to the solenoid can. An axially adjustable retainer is threadably connected to the valve body. A pole piece is connected to the solenoid can operable to transfer a magnetic flux generated by the coil. A homogenous valve member/armature slidably disposed in the axially adjustable retainer is operably pulled by a magnetic flux generated by the coil toward the pole piece between a valve closed position and a valve open position. A seal member disposed between the valve member/armature and the axially adjustable retainer is operable to create a fluid seal between the valve member/armature and the axially adjustable retainer to prevent a pressurized fluid within the valve body from contacting the coil in any of the valve open and closed positions.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
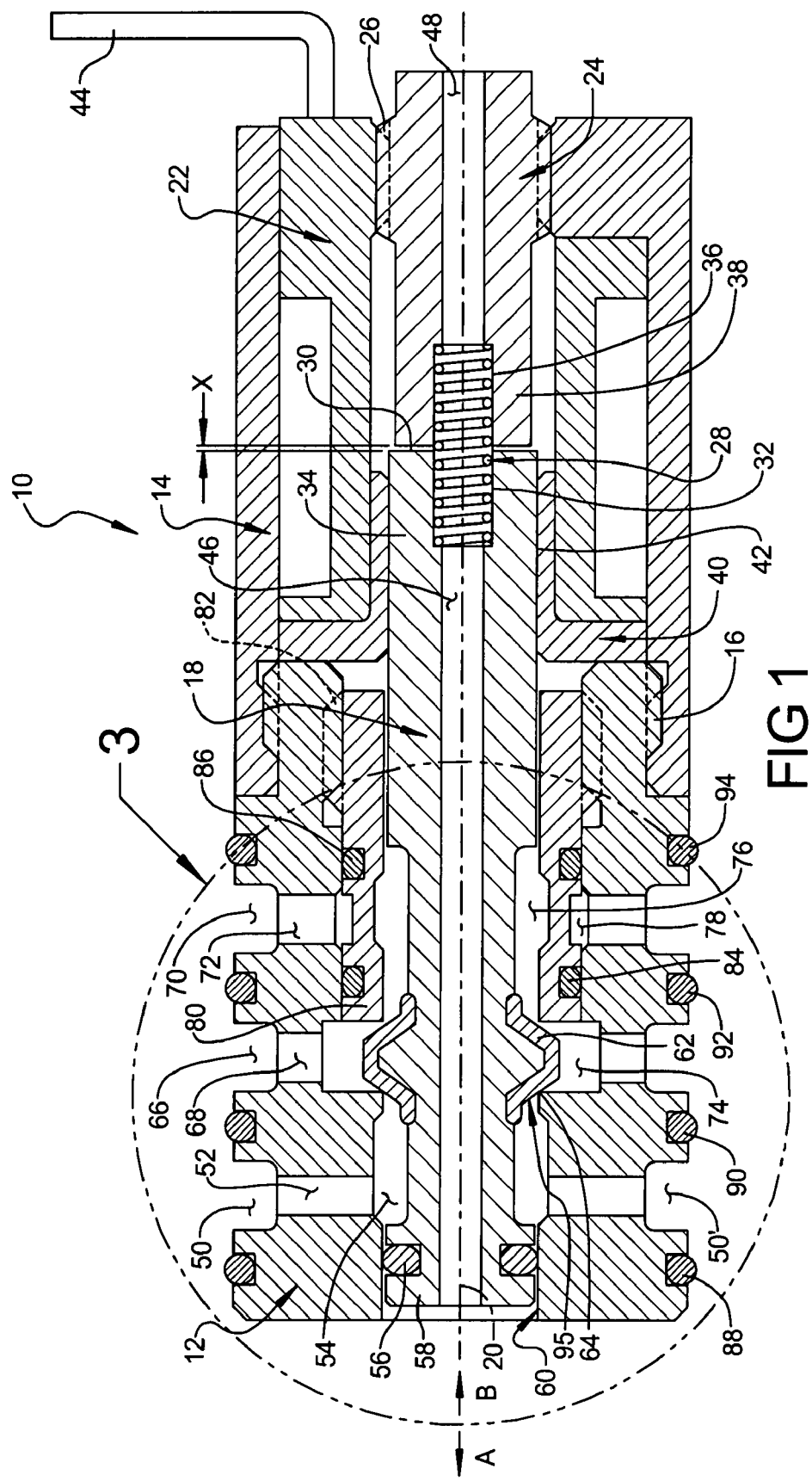
FIG. 1 is a cross sectional side elevational view of a 3-way pressure balanced solenoid operated valve of the present disclosure in a de-energized position.

The following description is merely exemplary in nature and is not intended to limit the present disclosure, application, or uses. It should be understood that throughout the drawings, corresponding reference numerals indicate like or corresponding parts and features.

Referring generally to FIG. 1, a valve assembly 10 of the present disclosure includes a valve body 12 releasably connected to a solenoid can 14 using a threaded connection 16. A combined valve member/armature 18 is slidable in either of a valve closing direction "A" or a valve opening direction "B". Valve member/armature 18 is made as a homogenous or unitary combination of a valve member and an armature in a single element. In several embodiments, valve member/armature 18 is made from a magnetically effected material such as steel, stainless steel, and the like.

A coil 22 which includes wire in a plurality of windings is positioned within solenoid can 14. An adjustable pole piece 24 is positioned within coil 22 and connected to solenoid can 14 using a threaded connection 26. Adjustable pole piece 24 transfers a magnetic flux from an energized coil 22 to "pull" valve member/armature 18 from a valve closed to a valve open position. A biasing member 28, such as a coiled spring, within valve body 12 provides a biasing force to continuously bias the valve member/armature 18 toward the valve closing direction "A". In the valve closed position shown, a clearance gap 30 is provided between valve member/armature 18 and adjustable pole piece 24. Clearance gap 30 is created when biasing member 28 biases valve member/armature 18 in the valve closing direction "A". Clearance gap 30 is adjustable by rotating adjustable pole piece 24 using threaded connection 26 to axially displace adjustable pole piece 24 in either of the valve opening direction "A" or the valve closing direction "B". Clearance gap 30 defines a total valve member/armature 18 axial displacement between the valve closed (de-energized) and valve open (energized) positions plus overstroke. Clearance gap 30 also provides for adjustable axial displacement to compensate for wear of the valve member and/or valve seat. Clearance gap 30 can be adjusted throughout the life of the valve assembly to maintain the response time of the valve consistent. Decreasing clearance gap 30 decreases the time it takes for the valve to open, i.e., the valve opening time, and conversely, increasing clearance gap 30 increases a valve opening time. Clearance gap 30 is initially set to achieve optimal performance for the particular application.

A first end of biasing member 28 is positioned within a member cavity 32 created at an end 34 of valve member/armature 18. A second end of biasing member 28 is retained within a pole piece cavity 36 created in a pole piece end 38 of adjustable pole piece 24. A solenoid bushing 40 is positioned between coil 22 and valve member/armature 18. Valve member/armature 18 is slidably disposed within a bushing bore 42 of solenoid bushing 40. A material for solenoid bushing 40 can be provided of a magnetic material such as steel or stainless steel and provides a sliding fit for valve member/armature 18. An electrical connector member 44 which can include one or more electrical wires is connected to and extends outwardly from coil 22. Electrical connector member 44 provides electrical power to energize coil 22 from a power source (not shown). Solenoid can 14, valve member/armature 18, coil 22, adjustable pole piece 24, solenoid bushing 40, and electrical connector member 44 together define a solenoid assembly.

A pressure equalizing passage 46 extending throughout a length of valve member/armature 18 is oriented longitudinally and substantially co-axially with a corresponding passage 48 created through adjustable pole piece 24. Pressure equalizing passage 46 and passage 48 together provide a flow path for fluids such as air which is displaced as valve member/armature 18 slides within valve body 12. Pressure equalizing passage 46 can also vent fluid (e.g., air) which is present due to seal leakage.

Valve body 12 includes an inlet port 50 which is in fluid communication with an inlet passage 52 which in turn connects to a pressurized chamber 54. Inlet passage 52 can be the same or a larger diameter as inlet port 50 or it can be smaller as shown. Inlet passage 52 can further be in the form of slots, or provided in other geometric shapes, including but not limited to rectangular, oval, and the like. Fluid in pressurized chamber 54 is provided from a source (not shown) of pressurized fluid such as air. The pressurized fluid is retained within pressurized chamber 54, when valve assembly 10 is in the valve closed position, by a seal 56 disposed in a piston 58 defining an end of valve member/armature 18. Piston 58 is slidably received within a cylinder bore 60 of valve body 12. An end of pressurized chamber 54 opposite from seal 56 is sealed when a valve element 62 is engaged with a first valve seat 64 of valve body 12. First valve seat 64 can define a sharp cornered, beveled, or rounded surface. Valve element 62 can be formed or machined from the same material as valve member/armature 18 or can be made of a resilient material such as rubber or synthetic rubber material connected such as by bonding, over-molding, loose seal, or other known processes to valve member/armature 18. Valve member/armature 18 can be made of any material able to be affected by the magnetic flux created through adjustable pole piece 24 when coil 22 is energized.

Valve body 12 also includes a cylinder port 66 in fluid communication with a cylinder port passage 68. An exhaust port 70 is also provided in valve body 12 which is in fluid communication with an exhaust port passage 72. Cylinder port passage 68 is in fluid communication with a cylinder port chamber 74. In several embodiments, cylinder port chamber 74 is created as a circumferential cavity in valve body 12. Exhaust port passage 72 is in fluid communication with an exhaust port chamber 76. In several embodiments, exhaust port chamber 76 is created as a circumferential depression or cavity in valve member/armature 18, which is positioned proximate to exhaust port 70 in any operating position of valve member/armature 18.

When valve assembly 10 is in the valve closed position, fluid within exhaust port chamber 76 is exhausted through an exhaust port cavity 78 which is in fluid communication via exhaust port passage 72 with exhaust port 70. According to several embodiments, exhaust port cavity 78 is created as a circumferential slot provided in an adjustable retainer 80 which is positioned proximate to exhaust port passage 72. Adjustable retainer 80 is connected to valve body 12, after insertion of valve member/armature 18, using a threaded connection 82 to be axially adjustable parallel to valve longitudinal axis 20 by rotating adjustable retainer 80. By axially moving adjustable retainer 80, a distance between adjustable retainer 80 and valve element 62 in the valve closed position can be increased or decreased and set at the optimal or desired position. This adjustment also determines a flow rate of the valve. A fluid seal is created between adjustable retainer 80 and an inner wall of valve body 12 using a first and a second O-ring 84, 86. First and second O-rings 84, 86 straddle exhaust port cavity 78, exhaust port passage 72, and exhaust port 70 and create a fluid seal which prevents fluid transfer through the exhaust port 70 or through the coil 22 section when valve member/armature is positioned in the valve open position.

Valve body 12 further includes a plurality of body seals which in the example shown are provided as rubber or resilient material O-rings, but which can also be other types of seals adaptable to act about the perimeter of valve body 12. These seals include a first body seal 88, a second body seal 90, a third body seal 92, and a fourth body seal 94. First, second, third and fourth body seals 88, 90, 92, 94 are partially received in seal cavities or circumferential slots created in valve body 12 and are intended to sealingly mate with a valve body block such as the body block shown and described in reference to FIG. 5. In several embodiments, valve body 12 having first, second, third and fourth body seals 88 through 94 therefore defines a cartridge assembly which is slidably received in and is removable from the corresponding body block.

The valve closed position shown in FIG. 1 is defined by engagement of a first side 95 of valve element 62 with first valve seat 64. The pressurized fluid provided through inlet port 50 is thereby retained within pressurized chamber 54. In the valve closed position fluid pressure in cylinder port 66 is vented through exhaust port 70 by a path which includes cylinder port chamber 74, exhaust port chamber 76, exhaust port cavity 78, and exhaust port passage 72. In the valve closed position, coil 22 is de-energized which allows the biasing force provided by biasing member 28 to bias valve member/armature 18 toward the valve closing direction "A" which seats valve element 62 against first valve seat 64. As previously noted, clearance gap 30 provided between first end 34 of valve member/armature 18 and pole piece end 38 of adjustable pole piece 24 is adjustable and can be made smaller or larger by rotating adjustable pole piece 24 using threaded connection 26 to either increase or decrease clearance gap 30. Increasing or decreasing clearance gap 30 can increase or decrease, respectively, an opening and closing time of valve assembly 10. Clearance gap 30 can also be maintained during the life of valve assembly 10, for example to allow for compression set or wear of valve element 62.

Axial adjustment of adjustable pole piece 24 operably controls a dimension "X" of clearance gap 30 created between adjustable pole piece 24 and the valve member/armature 18 with the valve member/armature 18 in the valve closed position. The clearance gap 30 also equates to a total throw distance of the valve member/armature 18, determined by a distance between the opposed valve seats, which effects the operating time of valve assembly 10. According to several embodiments, clearance gap 30 can be approximately 0.005 inches (0.13 mm). Access to adjustable pole piece 24 is provided through an open end of valve assembly 10, therefore adjustable pole piece 24 can be rotated to axially adjust its position to control the stroke or over-stroke of the solenoid assembly even when coil 22 of the valve is energized. Field adjustment of valve assembly 10 is therefore provided. Field adjustment also optimizes a valve shifting force, provides for wear compensation, and can be used to keep response times consistent throughout a valve lifespan.

Figure 2:
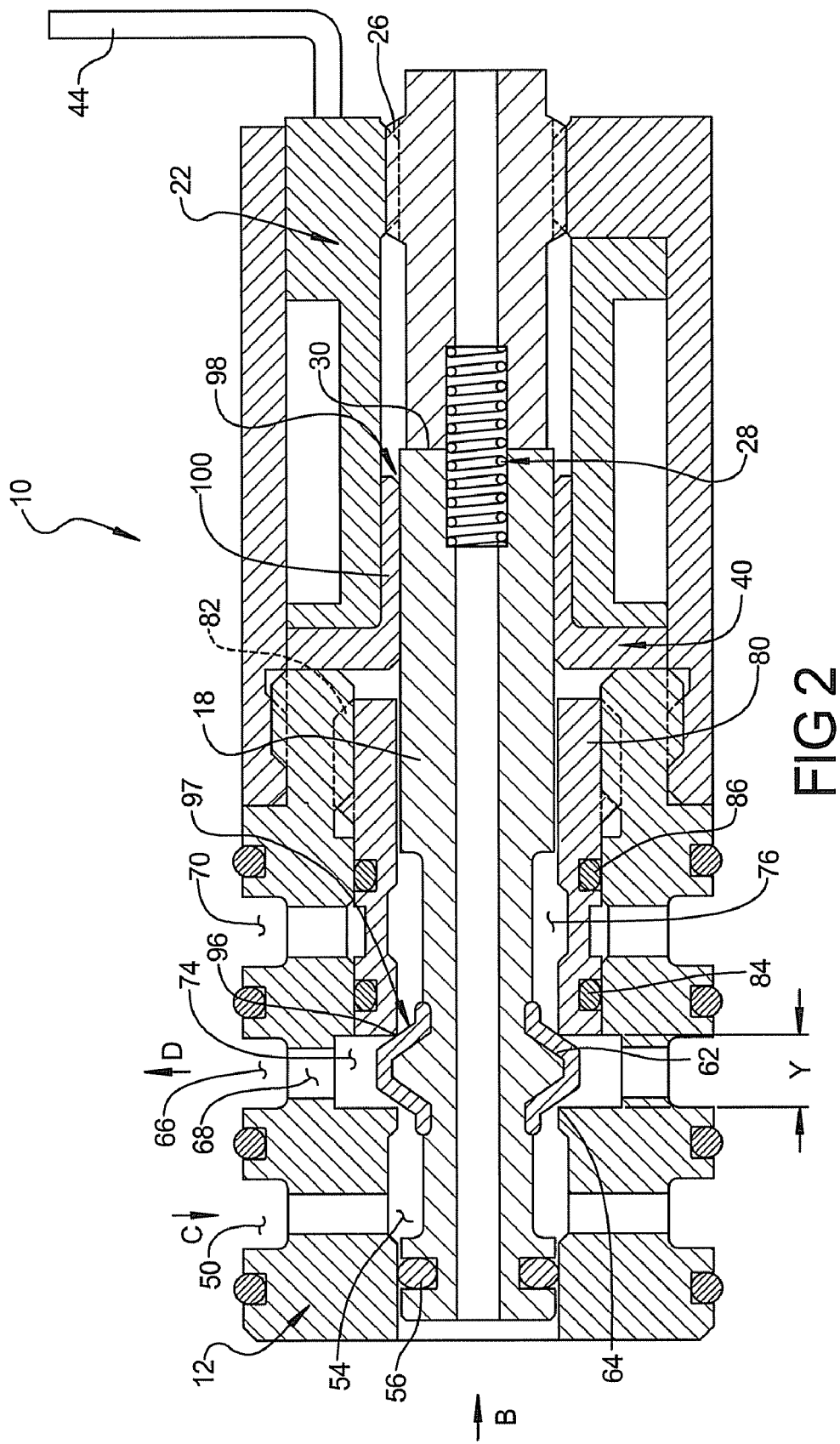
FIG. 2 is a cross sectional side elevational view of the valve of FIG. 1 in an energized position.

Referring now to FIG. 2, when coil 22 is energized a magnetic field or flux defining a pulling force is created through adjustable pole piece 24 which magnetically pulls or draws valve member/armature 18 in the valve opening direction "B" overcoming the biasing force of biasing member 28. A second valve seat 96 is defined at an end of adjustable retainer 80. The valve open position is defined when first side 95 of valve element 62 has moved away from first valve seat 64 and an opposed second side 97 of valve element 62 contacts second valve seat 96. The valve open position also occurs when clearance gap 30 is reduced but not permitted to reach a zero value, which would allow valve member/armature 18 to contact adjustable pole piece 24. Contact between valve member/armature 18 and adjustable pole piece 24 is undesirable because full sealing contact may not be present between valve member/armature 18 and adjustable pole piece 24, and because repeated contact can result in peening of the metal parts and increased noise. Eliminating contact therefore increases the operating life of valve assembly 10 by eliminating metal wear.

Second valve seat 96 can define a sharp cornered, beveled, or rounded end of adjustable retainer 80 positioned proximate to valve element 62. First valve seat 64 can also define a sharp cornered, beveled, or rounded shape. As previously noted, adjustable retainer 80, and therefore a position of second valve seat 96, is longitudinally adjustable by rotation of adjustable retainer 80 using threaded connection 82. By adjusting the axial position of adjustable retainer 80 and therefore second valve seat 96, a total distance "Y" between first valve seat 64 and second valve seat 96 can be adjusted. This adjustment allows for compression set and wear of valve element 62 and adjustment of the valve opening and closing times.

With coil 22 in the energized condition, valve assembly 10 will remain in the valve open position shown in FIG. 2. In the valve open position, the fluid such as pressurized air provided through inlet port 50 into pressurized chamber 54 is discharged via cylinder port chamber 74, cylinder port passage 68, and cylinder port 66 to a fluid operated component or device (not shown). Flow through valve assembly 10 is therefore in an inlet flow direction "C" through inlet port 50 and in an outlet flow direction "D" from cylinder port 66.

When valve element 62 is in contact with second valve seat 96 exhaust port 70 is isolated. In addition to the exit path provided by exhaust port 70, in the valve open position fluid in valve assembly 10 can also exit through a passage 98 defined between valve member/armature 18 and a bushing sleeve 100 of solenoid bushing 40. Fluid escaping through passage 98 will exit valve body 12 and valve assembly 10 through threaded connection 26 and therefore can contact coil 22. These paths are isolated in the valve closed position. Because it is anticipated that a pressure differential between fluid in exhaust port chamber 76 and exhaust port 70 is significantly less than a pressure differential between exhaust port chamber 76 via passage 98 and threaded connection 26, fluid will generally discharge via exhaust port 70 in the valve closed position. When coil 22 is de-energized, biasing member 28 will return valve member/armature 18 to the valve closed position shown in FIG. 1.

Figure 3:
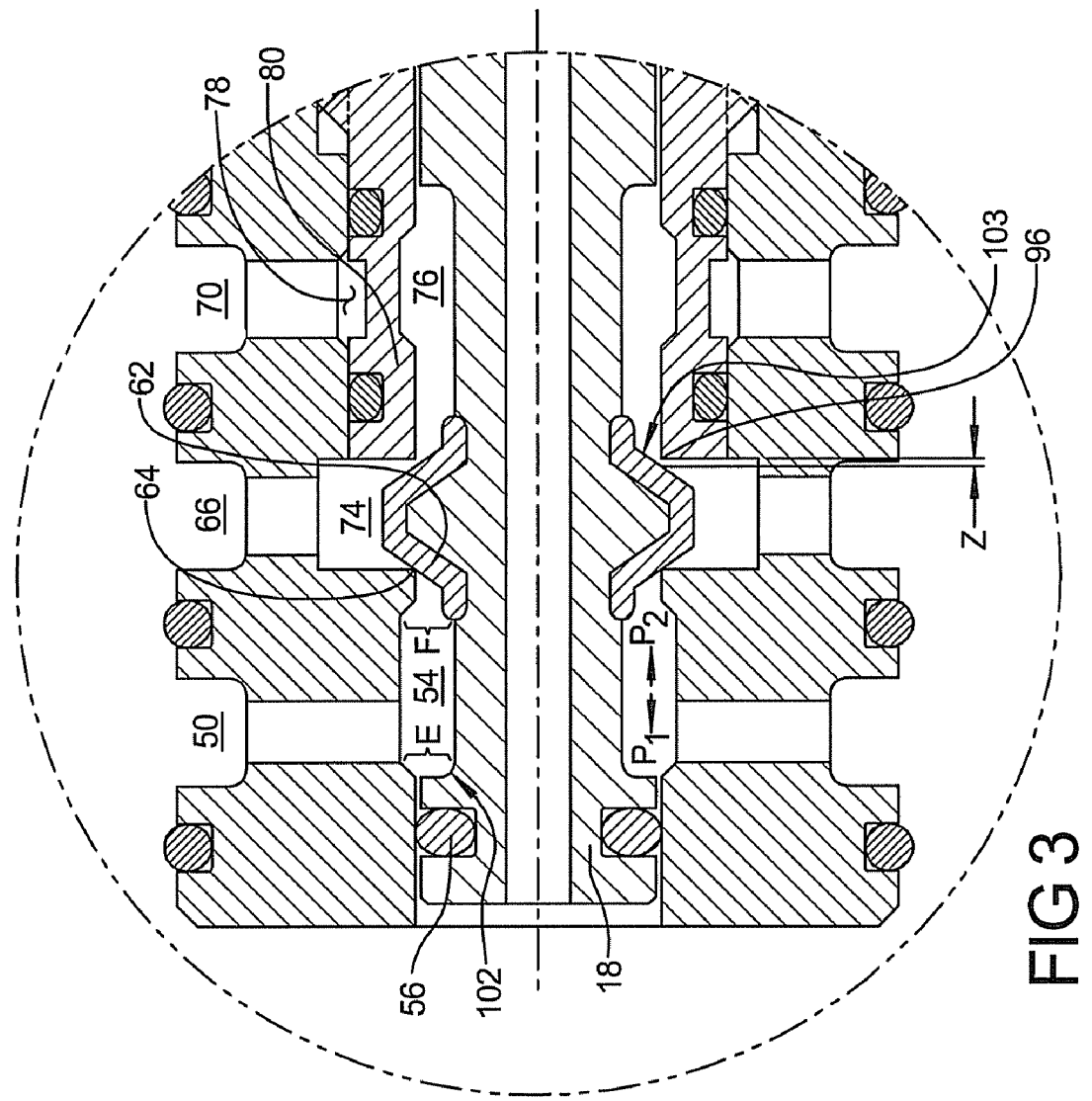
FIG. 3 is a cross sectional side elevational view showing area 3 of FIG. 1.

Referring now to both FIGS. 2 and 3, when valve member/armature 18 is in the valve closed position (FIG. 3) or the valve open position (FIG. 2), a "pressure balanced" condition exists due to the geometry provided at opposed ends of pressurized chamber 54. As specifically shown in FIG. 3, when valve element 62 is in contact with first valve seat 64, a first surface area "E" of a piston end wall 102 is substantially equal to a second surface area "F" of the corresponding fluid exposed portion of valve element 62. Therefore, a fluid pressure "$P_1$" acting against first surface area "E" is substantially equal to a fluid pressure "$P_2$" acting against second surface area "F". Because pressure "$P_1$" is substantially equal to pressure "$P_2$" the source pressure at inlet port 50 does not act to displace valve member/armature 18 from the valve closed position. The pressure balanced condition permits the biasing force provided by biasing member 28 (not shown in this view) to be the sole force acting to retain valve member/armature 18 in the valve closed position. When coil 22 is subsequently energized, neglecting the static forces affecting valve member/armature 18, the input force required to move valve member/armature 18 from the valve closed to the valve open positions only has to be greater than the biasing force of biasing member 28. This reduces the amount of energy required to displace valve member/armature 18 and therefore reduces the opening time of valve assembly 10. Even if valve element 62 wears over time with use, second surface area "F" is substantially unchanged, therefore retaining the pressure balanced condition on valve member/armature 18. A distance "Z" between a corner defined as second valve seat 96 of adjustable retainer 80 and a second face 103 of valve element 62 is shown. Distance "Z" is adjustable by axial displacement of adjustable retainer 80. The pressure balanced condition also occurs with the valve in the valve open position (FIG. 2) when fluid flow through cylinder port 66 stops, because the area of the opposed valve seat surfaces is substantially equal. These areas being pressure balanced also keep valve response times consistent with any variation of fluid pressure.

Referring back to FIG. 2, when valve assembly 10 is in the valve open position, after the fluid volume has passed from inlet port 50 through cylinder port 66 which is used to operate the downstream equipment, the fluid pressure at inlet port 50 is substantially equal to the fluid pressure at cylinder port 66. A "pressure balanced" condition substantially exists in the valve open position due to the angular shape of the opposed sides of valve element 62. The fluid pressure acting against opposed sides of valve element 62 at the point of contact of valve element 62 and second valve seat 96 is substantially equal. When coil 22 is subsequently de-energized, the biasing force of biasing element 28 needs to overcome only minimal fluid pressure to initiate movement of valve member/armature 18 from the valve closed position in the valve closing direction "A" back to the valve closed position shown in FIG. 1.

Figure 4:
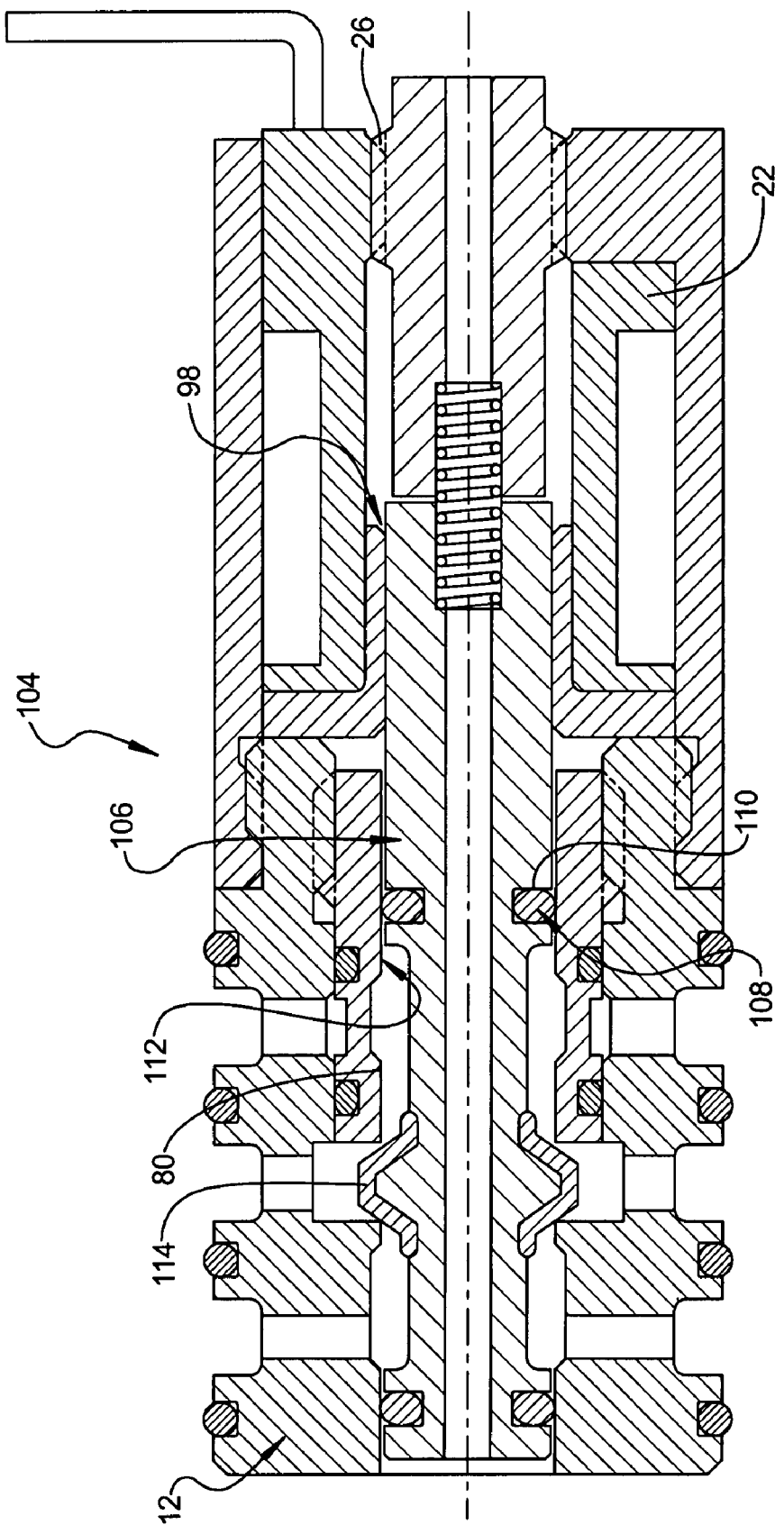
FIG. 4 is a cross sectional side elevational view of another pressure balanced solenoid operated valve modified from FIG. 1 to add a fluid seal preventing fluid entrance into the solenoid assembly.

Referring now to FIG. 4, a valve assembly 104 is modified from valve assembly 10 to add a fluid seal. A valve member/armature 106 is modified from valve member/armature 18 by adding a seal member 108 such as an O-ring which is positioned within a seal groove 110 created in valve member/armature 106. Seal member 108 provides a fluid seal between valve member/armature 106 and a bore face 112 of adjustable retainer 80. The remaining components of valve assembly 104 are substantially unchanged from valve assembly 10.

By adding seal member 108 to valve assembly 104, passage 98 is isolated under any operating condition of valve assembly 104. Use of seal member 108 can be selected depending upon the type of fluid to be controlled by valve assembly 104, for example in environments when the fluid is not easily filtered to remove contaminants such as dirt or moisture, or when the fluid is corrosive with respect to the materials of valve assembly 10 including coil 22. Use of seal member 108 prevents the damaging effects of the unfiltered or corrosive fluid from reaching the coil 22 area of valve assembly 104. When a valve element 114 of valve member/armature 106 contacts a valve seat in either the valve closed position or the valve open position, and for any position in between, seal member 108 isolates the flow path of passage 98 and threaded connection 26. The addition of seal member 108 also provides for the capability to use valve assembly 104 as a normally closed valve, a normally open valve, as a selector, or as a diverter assembly. The inlet port can also be relocated to any of the identified ports and valve assembly 104 can also be used with a vacuum system connected.

Figure 5:
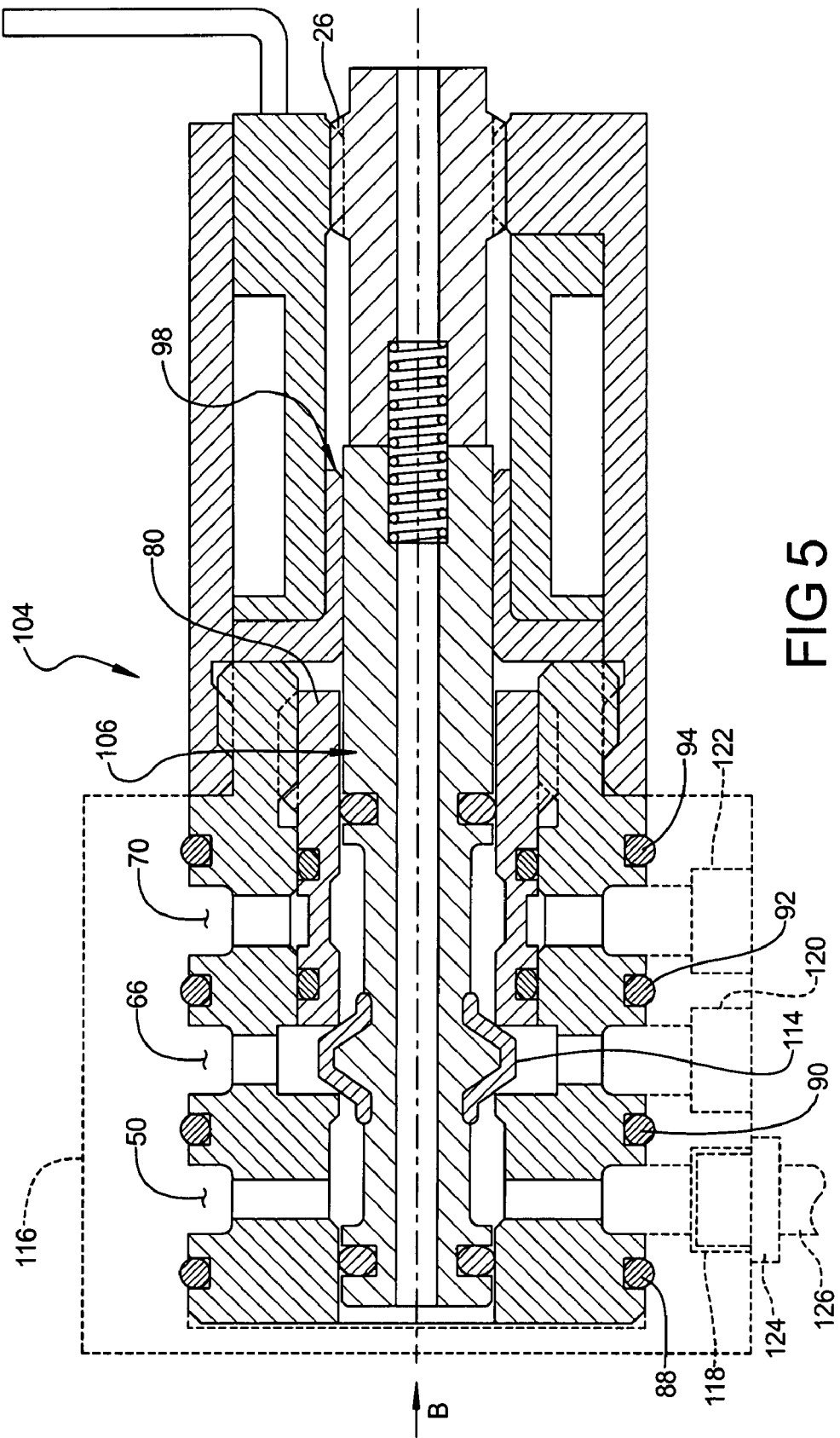
FIG. 5 is a cross sectional side elevational view of the valve of FIG. 4 in a valve open position, further showing the valve connected to a valve body block.

Referring now to FIG. 5, an exemplary installation of valve assembly 104 in a body block 116 is shown. Valve assembly 10 (not shown) would be similarly installed. Body block 116 is exemplary of any type of configuration for a receiving member of valve assembly 104. Body block 116 can include a plurality of fluid ports which define fluid communication paths for each of inlet port 50, cylinder port 66, and exhaust port 70. These fluid ports include a first fluid port 118 in fluid communication with each of the inlet ports 50, a second fluid port 120 in fluid communication with each of the cylinder ports 66, and a third fluid port 122 in fluid communication with each of the exhaust ports 70. First, second and third fluid ports 118, 120, 122 can be adapted to receive a connector 124 such as a threaded, welded, swaged, or other similar connector. Each connector 124 is in turn connected to a fluid line 126 which can provide for example a source of pressurized fluid to inlet port 50, a flow path for fluid discharged from valve assembly 104 to a pressure operable device, or to vent the fluid to atmosphere from exhaust port 70.

In the example shown by FIG. 5, valve member/armature 106 is positioned in the valve open position which provides a path of fluid communication between inlet port 50 and cylinder port 66. In this condition, fluid at inlet port 50 will pass through valve assembly 104 and discharge via cylinder port 66. Body seals such as first, second, third, and fourth body seals 88 through 94 permit valve assembly 104 to be releasably inserted as a cartridge into body block 116. This permits valve assembly 104 to be removed for maintenance such as replacement of any of the various seals or adjustment of adjustable retainer 80.

Figure 6:
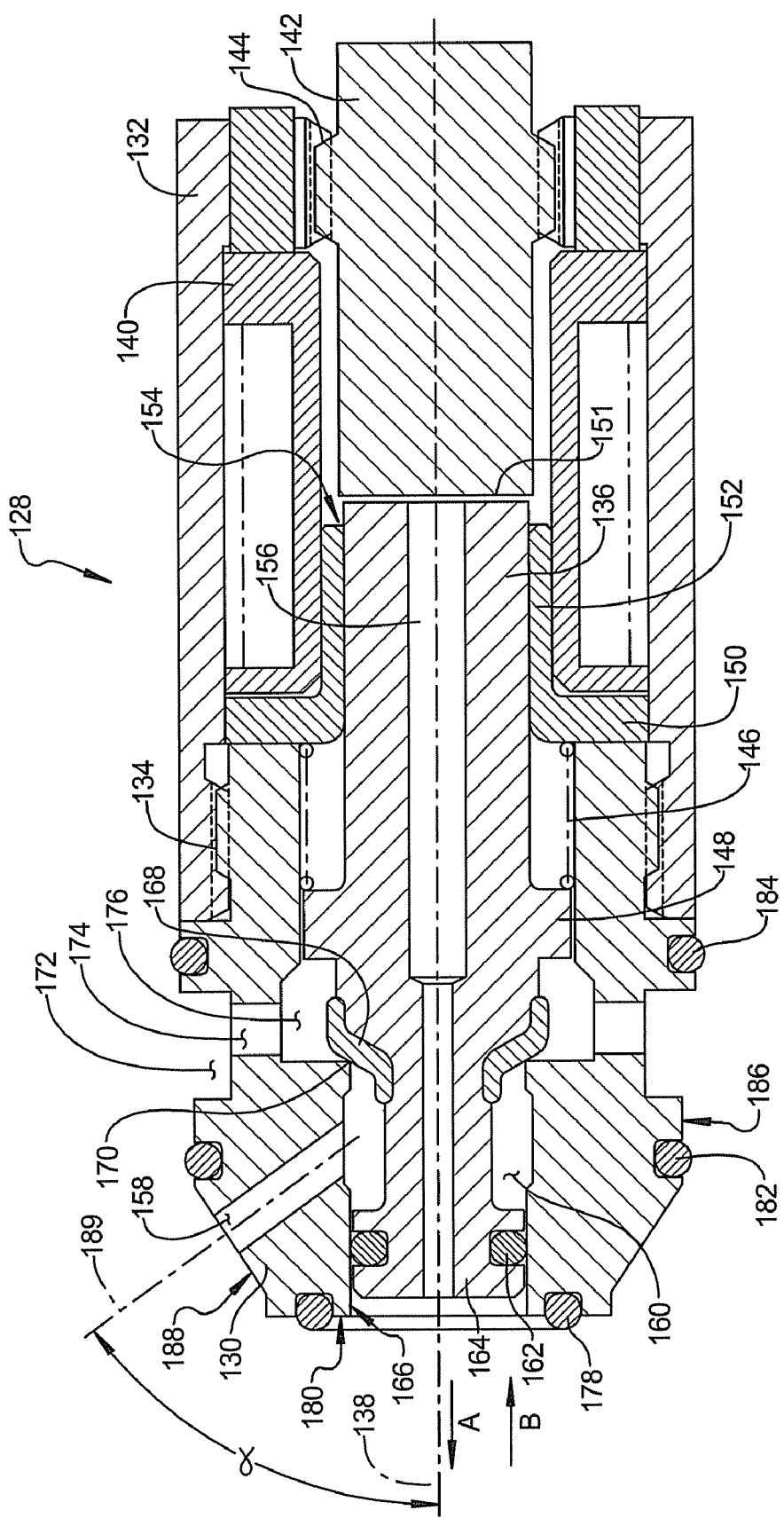
FIG. 6 is a cross sectional side elevational view of a two-way pressure balanced on the inlet side solenoid operated valve of the present disclosure.

Referring now to FIG. 6, a two-way valve assembly 128 of the present disclosure includes a valve body 130 releasably connected to a solenoid can 132 using a threaded connection 134. A valve member/armature 136 is slidably disposed in valve body 130 for sliding motion on a valve longitudinal axis 138. Similar to valve member/armature 18, valve member/armature 136 is displaceable in each of the valve closing direction "A" and the valve opening direction "B".

A coil 140 is disposed within solenoid can 132. An axially adjustable pole piece 142 similar to adjustable pole piece 24 is connected to solenoid can 132 using a threaded connection 144. A biasing member 146 such as a coil spring similar to biasing member 28 is positioned between a flanged portion 148 of valve member/armature 136 and a solenoid bushing 150. Biasing member 146 biases valve member/armature 136 in the valve closing direction "A" and therefore defines a clearance gap 151 between valve member/armature 136 and adjustable pole piece 142 when valve member/armature 136 is in the valve closed position. Clearance gap 151 is similar in function and adjustment to clearance gap 30 provided for valve assembly 10.

Valve member/armature 136 is slidably disposed within a bushing sleeve 152 of solenoid bushing 150. A passage 154 is created between bushing sleeve 152 and valve member/armature 136 similar to passage 98. A pressure equalizing passage 156 is also provided in valve member/armature 136 similar in function to equalizing passage 46.

Valve body 130 includes an inlet port 158 which is disposed at an angle α with respect to valve longitudinal axis 138. According to several embodiments angle α is approximately 45 degrees, but can vary at the discretion of the manufacturer. Inlet port 158 is in fluid communication with a pressurized chamber 160. Fluid in pressurized chamber 160 is retained by a seal 162 such as an O-ring circumferentially retained about a piston 164 of valve member/armature 136. Seal 162 contacts a cylinder bore 166 of valve body 130 to create a pressure fluid boundary at one end of pressurized chamber 160. An opposite end of pressured chamber 160 is created when a valve element 168 similar to valve element 62 contacts a valve seat 170 of valve body 130. The pressure balanced condition of valve assembly 10 is duplicated by the configuration of two-way valve assembly 128.

Valve body 130 further includes a cylinder port 172 which is in fluid communication using a cylinder port passage 174 with a cylinder port chamber 176. Fluid pressure in inlet port 158 in normally isolated from cylinder port chamber 176 and therefore from cylinder port 172 in the valve closed position by contact of valve element 168 with valve seat 170. A seal member (not shown) such as seal member 108 shown and described in reference to FIG. 4 can also be added to valve member/armature 136 to prevent pressurized fluid transfer through passage 154 and threaded connection 144. This seal member can be positioned in flanged portion 148 or between valve member/armature 136 and bushing sleeve 152.

Valve body 130 differs from valve body 12 in its geometry proximate to the position of piston 164. A first body seal 178 such as an elastomeric material O-ring is positioned in a slot or groove created in an end face 180 of valve body 130. End face 180 is oriented substantially perpendicular to valve longitudinal axis 138. A second body seal 182 and a third body seal 184 are both disposed in corresponding slots created in a side face 186 of valve body 130. An angularly oriented face 188 is created between end face 180 and side face 186. Angled face 188 is substantially perpendicular to a central axis 189 of inlet port 158.

Operation of two-way valve assembly 128 is similar to each of valve assemblies 10 and 104. When coil 140 is de-energized the biasing force of biasing member 146 urges valve member/armature 136 toward the valve closed position. When coil 140 is energized, the magnetic flux induced through adjustable pole piece 142 pulls or draws valve member/armature 136 toward adjustable pole piece 142 until clearance gap 151 is reduced substantially to zero. Contact between valve member/armature 136 and adjustable pole piece 142 is anticipated in the design of two-way valve assembly 128. An additional item such as a resilient material bushing or pad (not shown) can be positioned between valve member/armature 136 and adjustable pole piece 142, if desired, to reduce contact force and associated noise. When valve member/armature 136 moves in the valve opening direction "B", valve element 168 withdraws from valve seat 170 allowing fluid in pressurized chamber 160 to discharge via cylinder port chamber 176, cylinder port passage 174 and through cylinder port 172. The use of flanged portion 148 of valve member/armature 136 allows biasing member 146 to be positioned outside of valve member/armature 136, eliminating the need for member cavity 32 and pole piece cavity 36 of valve assembly 10.

Figure 7:
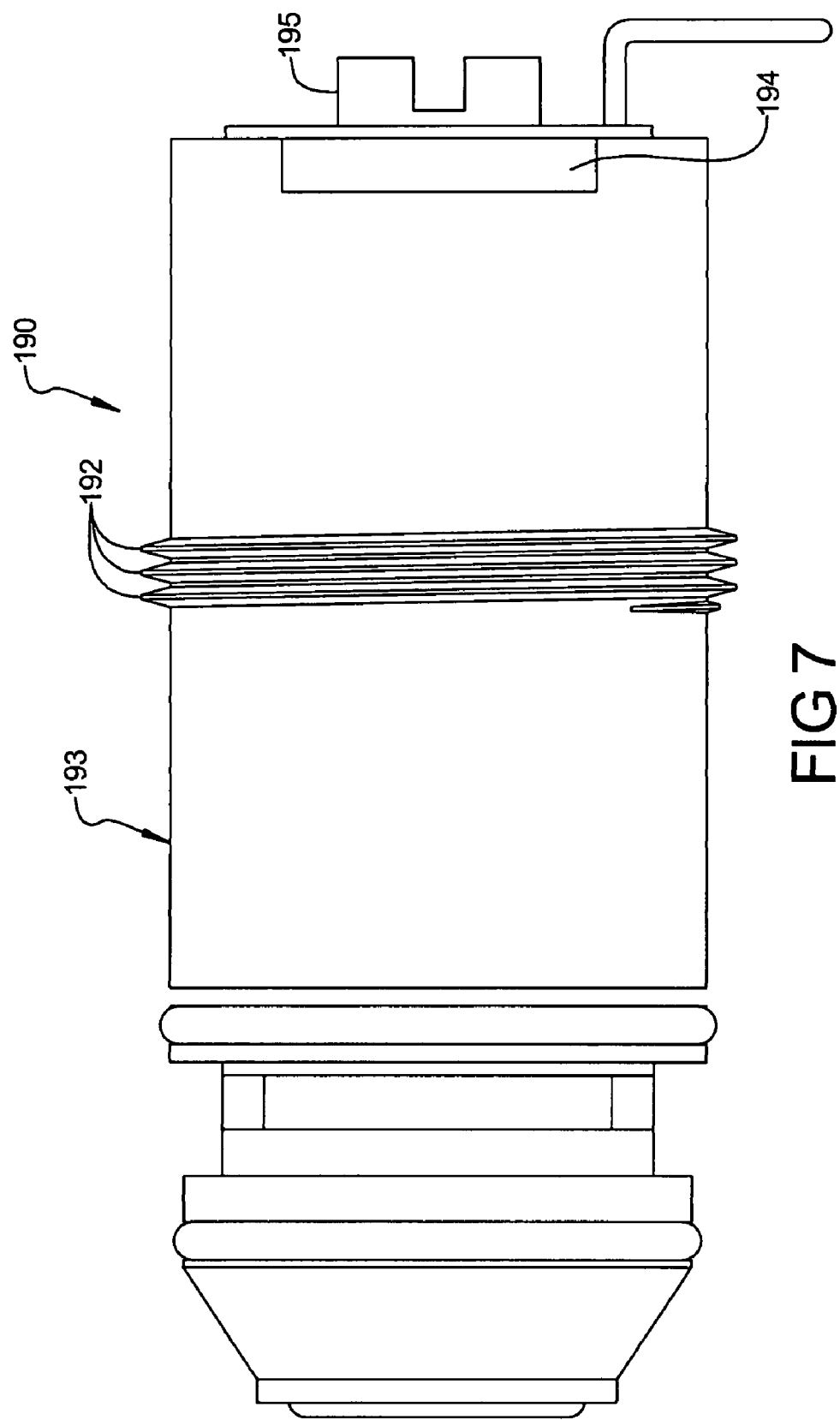
FIG. 7 is a side elevational view of another embodiment of a two-way pressure balanced on the inlet side solenoid operated valve of the present disclosure.

Referring now to FIG. 7, a two-way valve assembly 190 is modified from two-way valve assembly 128 by the addition of a plurality of external body threads 192 which extend radially outward from a solenoid can 193. Threads 192 permit valve assembly 190 to be positively engaged with internal threads of a manifold such as a manifold block 196 which will be better described in reference to FIG. 8. To assist in rotating valve assembly 190 during thread engagement, an opposed pair of wrench flats 194 (only one wrench flat is visible in this view) are provided with solenoid can 193. A fastener such as a wrench can engage wrench flats 194 to apply additional torque during assembly. In addition, a slotted end can be provided in an adjustable pole piece 195 for engagement by a different installation tool such as a screwdriver.

Figure 8:
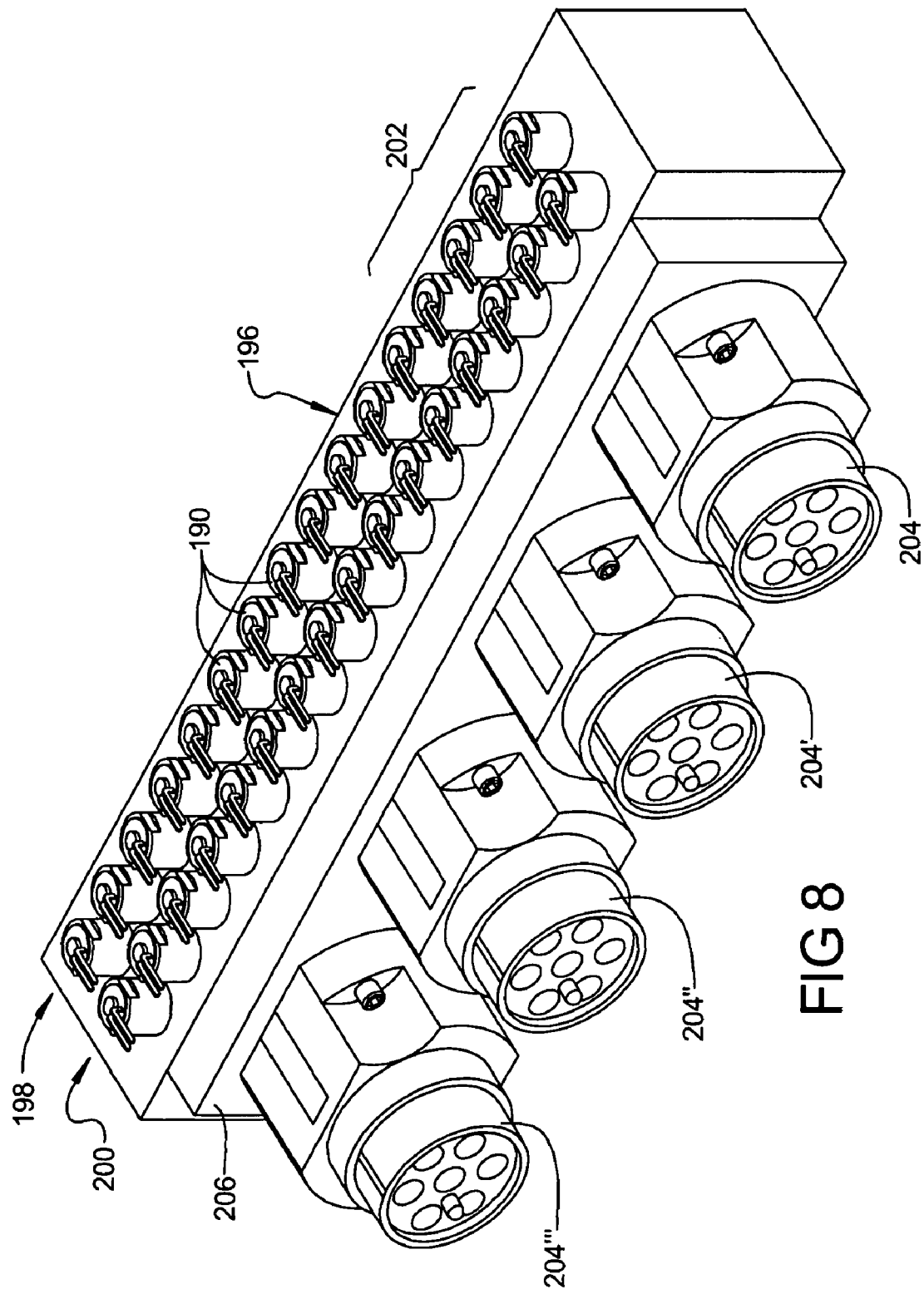
FIG. 8 is a perspective view of a manifold assembly having a plurality of the two-way pressure balanced valves of FIG. 7 in communication with multiple flow distribution devices.

Referring now to FIG. 8, a plurality of valve assemblies of the present disclosure can be commonly connected to a manifold as a space and costs saving measure, for operation of multiple components by the valve assemblies. In an exemplary embodiment, a plurality of valve assemblies 190 are threadably connected into individual threaded receiving apertures of a manifold block 196. The valve assemblies 190 can be arranged in substantially parallel rows, indicated by first and second rows 198, 200. Groups of the valve assemblies 190, as shown by an exemplary group 202, can be commonly connected to one or more flow distribution devices 204. In the present configuration, group 202 includes eight valve assemblies 190 which are commonly connected by internal flow passages (not shown) of manifold block 196 and a device mounting block 206 to flow distribution device 204. Additional groups of valve assemblies 190 can in turn be connected to each of flow distribution devices 204', 204", and 204'". The quantity of valve assemblies and flow distribution devices is not limited by the exemplary configuration shown, and can vary at the discretion of the manufacturer. Grouping multiple ones of the valve assemblies also provides for ease in making the electrical connections to the valve assemblies, as a wiring harness (not shown) can be used to electrically energize multiple valve assemblies.

Figure 9:
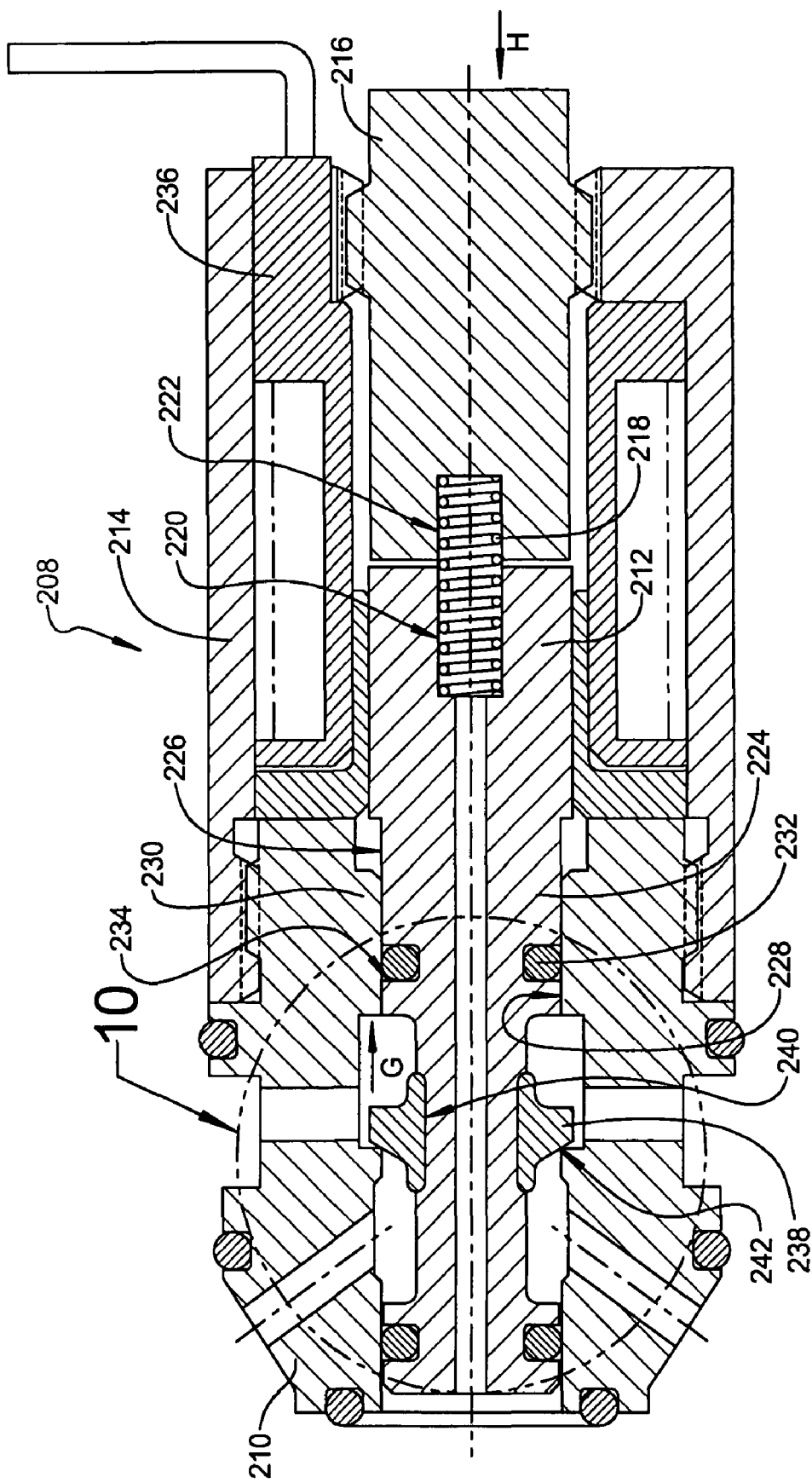
FIG. 9 is a cross sectional side elevational view of a two-way pressure balanced on the inlet side solenoid operated valve of the present disclosure modified from the valve of FIG. 6.

Referring now to FIG. 9, another embodiment of a two-way pressure balanced valve assembly 208 is modified from two-way valve assembly 128. Only the modified portions will therefore be further discussed. Two-way valve assembly 208 includes a valve body 210 having a homogenous valve member/armature 212 slidably disposed therein. Valve body 210 is threadably connected to a solenoid can 214. Solenoid can 214 has an adjustable pole piece 216 threadably connected thereto, similar to adjustable pole piece 142. Valve member/armature 212 and adjustable pole piece 216 are modified to include a resilient member 218 such as a coiled spring disposed within a member cavity 220 and a pole piece cavity 222, respectively. Resilient member 218 biases valve member/armature 212 in a direction "H" tending to close valve assembly 208.

Valve member/armature 212 is modified from valve member/armature 136 to include a radial flange portion 224 which includes an outer surface 226 slidably received within a receiving cavity 228 of a raised body portion 230. A seal 232 such as an O-ring positioned within a seal groove 234 of radial flange portion 224 provides a fluid boundary seal to prevent fluid from escaping past radial flange portion 224 and contacting a coil 236. Valve member/armature 212 further includes a valve element 238 integrally connected to valve member/armature 212 within a radial pocket 240 of valve member/armature 212, and therefore is modified from valve elements 62 and 168 as will be described in better detail in reference to FIG. 10. Valve element 238 contacts a valve seat 242 similar to valve seat 170. In order to load valve member/ armature 212 into valve body 210 in direction "H", valve element 238 is adapted to be deflectable in a direction "G" to allow valve element 238 to deflect when disposed through receiving cavity 228 of raised body portion 230.

Figure 10:
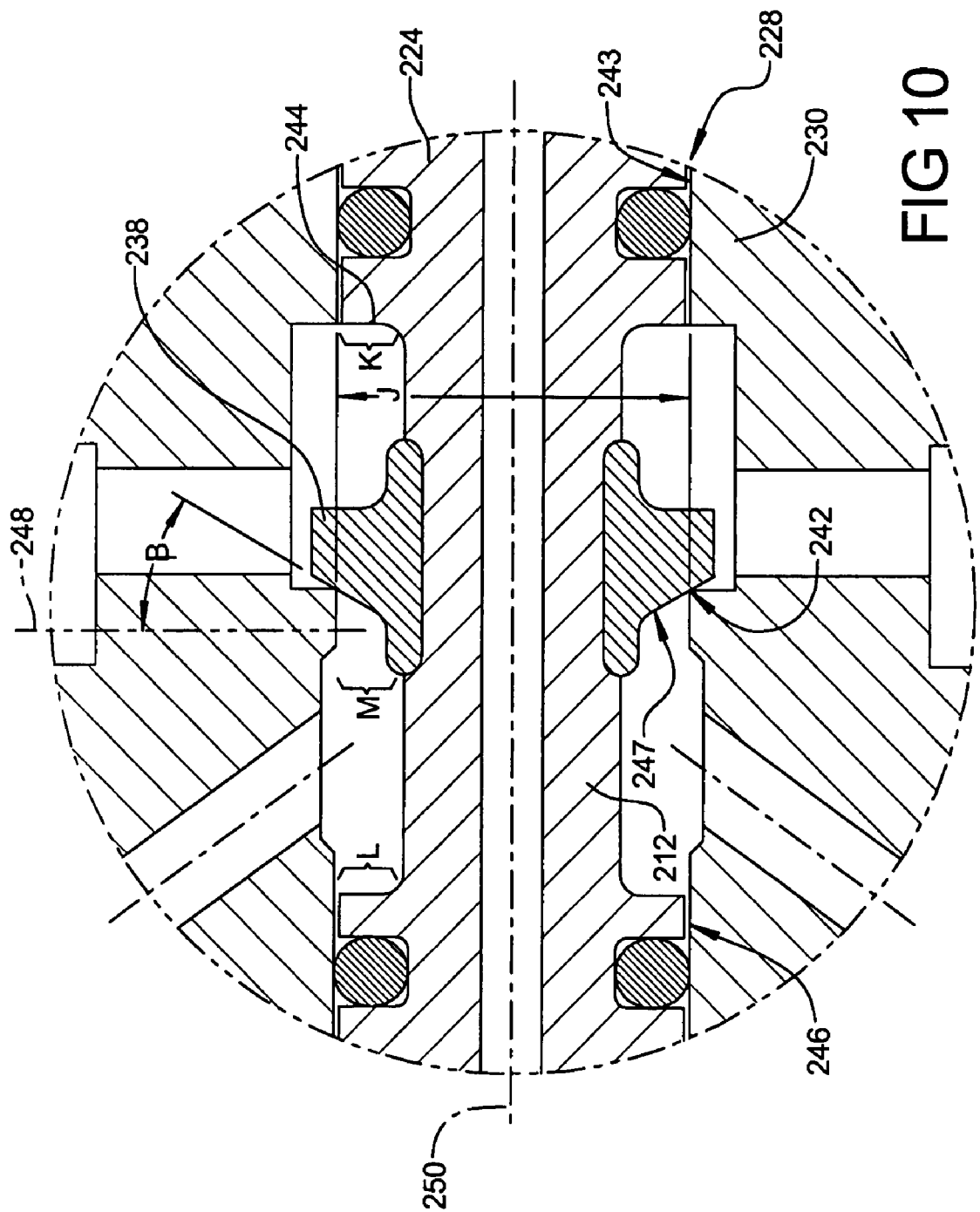
FIG. 10 is a cross sectional side elevational view showing area 10 of FIG. 9.

Referring now to FIG. 10, both valve seat 242 and an internal surface 243 defined by receiving cavity 228 have substantially the same diameter "J". An end wall 244 of radial flange portion 224 therefore defines a surface area "K" which is substantially equal to a surface area "L" of a piston 245 (similar to piston 164) received in a piston cavity 246. Surface area "K" is also substantially equal to a surface area "M" of a portion of valve element 238 exposed to fluid pressure in the valve closed condition shown. Surface areas "L" and "M" are similar in function to first and second surface areas "E" and "F" shown in FIG. 3. When coil 236 (shown in FIG. 9) is energized, valve member/armature 212 is moved to a valve open position (not shown) and fluid pressure acting on surface areas "L" and "K" are balanced.

Valve element 238 is modified from valve elements 62 and 168 by eliminating any portion of valve member/armature 212 extending radially outward which was partially received within valve elements 62 and 168. In contrast, valve element 238 is received in radial pocket 240 which allows the portion of valve element 238 which freely radially extends away from valve member/armature 212 to deflect or bend. To further assist deflection of valve element 238 when valve member/armature 212 is loaded, a surface 247 of valve element 238 is oriented at an angle β with respect to an axis 248 oriented substantially perpendicular to a longitudinal axis 250 of valve assembly 208. According to several embodiments, angle β can vary from approximately 20 degrees up to approximately 60 degrees. This range of angles is not limiting, however, and angle β can be larger or smaller at the discretion of the manufacturer.

The coils 22, 140 for valve assemblies of the present disclosure are shown herein as substantially circular or tubular in shape. This shape is not limiting to the present disclosure. Additional coil shapes can also be used, such as rectangular, or non-round shapes such as oval, or multiple other geometric shapes. By varying the geometric shape of the coil, the coil wattage or valve operating speed can be varied by varying the design and quantity of windings defining an effective area of the coil. The remaining operating features of the valve assemblies of the present disclosure can be maintained with the various coil geometries described. The shape of the solenoid cans (14, 132, 193, 214) and the adjustable pole pieces (24, 142, 195, 216) can also be modified to correspond to the geometric shape of the coil. For example, a generally rectangular shaped solenoid can 193 can eliminate the need for the wrench flats 194 of valve assembly 190 shown in FIG. 7.

Although a cartridge style valve body (12, 130, 190, 210) is shown herein, the valve body can also have other configurations, such as but not limited to inline or manifold body styles. A valve stroke defined as the axial displacement of the valve member/armature (18, 106) from the valve closed to the valve open position is predetermined by the axial location of the adjustable retainer (80). A solenoid stroke generated by the solenoid assembly is predetermined by the axial location of the adjustable pole piece (24, 142, 195, 216). Valve assemblies of the present disclosure are also not limited to two-way and three-way designs, and can also be 4-way or greater valves.

Pressure balanced solenoid operated valves of the present disclosure offer several advantages. By controlling the geometry at opposed ends of a pressurized chamber, a pressure balanced condition is created between a piston of a valve member/armature and a resilient valve element seated against a valve seat. The pressure balanced condition allows the valve member/armature to be retained in the valve closed position by the force of a biasing member only. To move the valve member/armature to a valve open position, the magnetic flux generated by a coil only has to overcome the biasing force of the biasing member. Due in part to the pressure balanced design of valve assemblies of the present disclosure, valve operating times less than 0.0004 seconds can be achieved, and valve operating frequencies greater than 2200 cycles per second can also be achieved. According to several embodiments an axially adjustable retainer permits axial adjustment within a range of approximately 0.002 inches (0.05 mm) to 0.025 inches (0.635 mm). By providing an axially adjustable pole piece independent of the axially adjustably second valve seat provided by the retainer, the overall solenoid stroke of the valve can be retained throughout its life or adjusted. Access to the adjustable pole piece is provided through an open end of the valve assembly, therefore the pole piece can be axially adjusted over the life of the valve to control a stroke or over-stroke of the solenoid assembly even when the valve is energized. External seals provided on the valve body allow the valve body to be inserted or removed as a cartridge assembly from an installed position in a valve body block or similar structure.

What is claimed is:

1. A solenoid operated valve assembly, comprising:
   a solenoid can;
   a valve body connected to the solenoid can having an inlet port and a fixed first valve seat;
   a pole piece to transfer a magnetic flux connected to the solenoid can;
   a valve member/armature having a first end positioned proximate to the pole piece and a piston defining a second end, the valve member/armature created of a homogenous single element of a magnetically effected material throughout including the first and second ends;
   a resilient material valve element positioned between the first and second ends and connected to the valve member/armature, the valve member/armature slidably disposed in the valve body and movable from a valve closed position having the valve element contacting the first valve seat toward the pole piece to reach a valve open position in the presence of the magnetic flux;
   a biasing member partially received in each of a pole piece cavity and a member cavity of the valve member/armature, acting to continuously bias the valve member/armature away from the pole piece and toward the valve closed position;
   a first end wall of the second end in continuous fluid communication with a pressurized fluid at the inlet port in both the valve open and closed positions; and
   a second valve seat movably positioned with respect to the fixed first valve seat, a first side of the valve element contacting the fixed first valve seat in the valve closed position and a second side of the valve element contacting the second valve seat in the valve open position.

2. The solenoid operated valve assembly of claim 1, further comprising:
   a first surface area of the first end wall; and
   the first side of the valve element in the valve closed position defining a second surface area in fluid communication with the pressurized fluid;
   wherein the first surface area is substantially equal to the second surface area with the pressurized fluid acting on both the first and second surface areas defining a pressure balanced condition in the valve closed position.

3. The solenoid operated valve assembly of claim 2, further comprising:
   a retainer threadably connected to the valve body to be axially movable in the valve body, the retainer having a retainer end defining the second valve seat, wherein threaded movement of the retainer permits the second valve seat to be movably positioned with respect to the first valve seat; and
   the second side of the valve element when the valve element is in contact with the second valve seat defining a surface area in fluid communication with the pressurized fluid;
   wherein the first surface area is substantially equal to the surface area of the second side defining a pressure balanced condition in the valve open position.

4. The solenoid operated valve assembly of claim 1, further comprising a retainer threadably connected to the valve body and slidably receiving the valve member/armature, the retainer having a retainer end defining the second valve seat, wherein axial threaded movement of the retainer operates to permit movement of the second valve seat with respect to the fixed first valve seat.

5. The pressure balanced solenoid operated valve assembly of claim 4, wherein axial displacement of the retainer operates to axially position the second valve seat at a distance from the fixed first valve seat.

6. The solenoid operated valve assembly of claim 1, wherein a total axial throw of the valve member/armature is defined by an adjustable clearance gap created between the pole piece and the valve member/armature in the valve open position, and wherein the pole piece is axially adjustable using a threaded connection between the pole piece and the solenoid can to vary the clearance gap, the clearance gap defining a total valve member/armature axial displacement between the valve closed and valve open positions plus over-stroke.

7. The solenoid operated valve assembly of claim 1, wherein the valve member/armature further comprises a pressure equalizing passage extending throughout a length of the valve member/armature and opening into the member cavity.

8. The solenoid operated valve assembly of claim 7, further comprising a fluid passage extending through the pole piece and opening into the pole piece cavity, the fluid passage axially aligned with the pressure equalizing passage.

9. The solenoid operated valve assembly of claim 1, further including:
   a coil disposed within the solenoid can operating when energized to create the magnetic flux through the pole piece to pull the valve member/armature toward the pole piece in a valve opening direction; and
   an open end of the valve assembly providing access to the pole piece such that the pole piece is rotatable when the coil is energized to axially adjust an axial pole piece position to control a stroke or over-stroke of the valve member/armature.

* * * * *